United States Patent [19]

Chester et al.

[11] 4,414,097
[45] Nov. 8, 1983

[54] CATALYTIC PROCESS FOR MANUFACTURE OF LOW POUR LUBRICATING OILS

[75] Inventors: Arthur W. Chester, Cherry Hill; William E. Garwood, Haddonfield, both of N.J.

[73] Assignee: Mobil Oil Corporation, N.Y.

[21] Appl. No.: 369,852

[22] Filed: Apr. 19, 1982

[51] Int. Cl.[3] .................. C10G 49/08; C10G 47/16
[52] U.S. Cl. ........................................ 208/59; 208/18; 208/58; 208/61; 208/95; 208/111
[58] Field of Search ............... 208/59, 111, 18, 120, 208/DIG. 2, 61, 95

[56] References Cited

U.S. PATENT DOCUMENTS

| | | | |
|---|---|---|---|
| 4,076,842 | 2/1978 | Plank et al. | 423/328 |
| 4,104,151 | 8/1978 | Rubin et al. | 208/111 |
| 4,137,148 | 1/1979 | Gillespie et al. | 208/87 |
| 4,162,962 | 7/1979 | Stangeland et al. | 208/58 |
| 4,222,855 | 9/1980 | Pelrine et al. | 208/111 |
| 4,283,271 | 8/1981 | Garwood et al. | 208/59 |
| 4,283,272 | 8/1981 | Garwood et al. | 208/59 |
| 4,347,121 | 8/1982 | Mayer et al. | 208/58 |

Primary Examiner—Delbert E. Gantz
Assistant Examiner—G. E. Schmitkans
Attorney, Agent, or Firm—Alexander J. McKillop; Michael G. Gilman; Dennis P. Santini

[57] ABSTRACT

This invention relates to an energy-efficient process for dewaxing hydrocrackate and manufacturing a stabilized and dewaxed hydrocracked lubricating oil stock from hydrocarbon feedstock boiling above about 343° C.

12 Claims, 4 Drawing Figures

PROCESS FLOW DIAGRAM

CATALYTIC PROCESS FOR MANUFACTURE OF LOW POUR LUBRICATING OILS

BACKGROUND OF THE INVENTION

1. Field of the Invention

This invention relates to a process for manufacture of lubricating oils. In particular, it relates to a specific hydrocrackate dewaxing process and to a specific combination of unit processes whereby a hydrocracked lube oil of good stability and low pour point is produced with high energy and other efficiencies.

2. Prior Art

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 230° C. (450° F.), the molecular weight of the hydrocarbon constituents is high and these constituents display almost all conceivable structures and structure types. This complexity and its consequences are referred to in "Petroleum Refinery Engineering", by W. L. Nelson, McGraw Hill Book Company, Inc., New York, N.Y., 1958 (Fourth Edition), relevant portions of this text being incorporated herein by reference for background.

In general, the basic notion in lubricant refining is that a suitable crude oil, as shown by experience or by assay, contains a quantity of lubricant stock having a predetermined set of properties such as, for example, appropriate viscosity, oxidation stability, and maintenance of fluidity at low temperatures. The process of refining to isolate that lubricant stock consists of a set of subtractive unit operations which removes the unwanted components. The most important of these unit operations include distillation, solvent refining, and dewaxing, which basically are physical separation processes in the sense that if all the separated functions were recombined one would reconstitute the crude oil.

Unfortunately, crude oils suitable for the manufacture of lubes are becoming less available due to exhaustion of reserves, and the reliability of a steady, adequate supply from a known source is a matter of concern.

The desirability of upgrading a crude fraction normally considered unsuitable for lubricant manufacture to one from which good yields of lubes can be obtained has long been recognized. The so-called "hydrocracking process", sometimes referred to in the art as "severe hydrotreating", has been proposed to accomplish such upgrading. In this process, a suitable fraction of a poor grade crude, such as a California crude, is catalytically reacted with hydrogen under pressure. The process is complex in that some of the oil is reduced in molecular weight and made unsuitable for lubes, but concurrently a substantial fraction of the polynuclear aromatics is hydrogenated to form naphthenes and paraffins. Process conditions and choice of catalyst are selected to provide an optimal conversion of the polynuclear aromatic content of the stock, since this component degrades the viscosity index and stability of the stock. Also, in the hydrocracking process, paraffins can be isomerized, imparting good viscosity index characteristics to the final lube product. For purposes of this invention, the term "hydrocracking" will be employed for the foregoing process step and to distinguish this step from the "hydrotreating" step to be described below, the purpose of the latter being to stabilize the lube base stock produce by hydrocracking. For purposes of this invention, the hydrocracking and hydrotreating steps may be distinguished also by the amount of hydrogen consumed, the hydrocracking step typically consuming about 1000-2000 SCF/bbl (standard cubic feet per barrel of feed) while the hydrotreating step consumes only about 100-200 SCF/bbl.

The hydrocracking process for increasing the availability of lube oils has an attractive feature that is not immediately apparent. Generally, the composition and properties of hydrocracked stocks are not particularly affected by the source and nature of the crude, i.e. they tend to be much more alike than lube fractions prepared from different crudes by conventional means. Thus, the process promises to free the refiner from dependence on a particular crude, with all of the advantages that this freedom implies.

Hydrocracked lube stocks, however, tend to be unstable in the presence of air when exposed to sunlight. On such exposure, a sludge is formed, sometimes very rapidly and in fairly substantial amount. This tendency in a lubricating oil is unacceptable. Additionally, some hydrocracked lube oils tend to darken or to form a haze.

Several methods have been proposed to correct the above-described instability. U.S. Pat. No. 4,031,016 proposes to add certain antioxidants to the hydrocracked oil. A second proposed approach is to hydrotreat the hydrocrackate. Variants of this approach are described in U.S. Pat. No. 3,666,657 which teaches a sulfided mixture of an iron group metal and a Group VI metal for the hydrotreating stage; U.S. Pat. No. 3,530,061 which utilizes a hydrotreating catalyst having one or more elements from Group IIB, VIB and VIII at hydrogen pressure up to about 100 psig; and U.S. Pat. No. 4,162,962 which teaches to hydrotreat the hydrocrackate at a temperature in the 200° C. to 300° C. range with a catalyst of prescribed pore size. U.S. Pat. No. 3,530,061 teaches a non-cracking support for the hydrotreating stage. U.S. Pat No. 3,852,207 teaches to hydrotreat with a noble metal hydrogenation component supported on an oxide. The patents cited above are believed representative of the state of the art, and each is incorporated herein by reference.

Hydrocracked lubricating oils generally have an unacceptably high pour point and require dewaxing. Solvent dewaxing is a well-known and effective process but expensive. More recently catalytic methods for dewaxing have been proposed. u.S. Pat. No. Re. 28,398 describes a catalytic dewaxing process wherein a particular crystalline zeolite is used. To obtain lubricants and specialty oils with outstanding resistance to oxidation, it is often necessary to hydrotreat the oil after catalytic dewaxing, as illustrated by u.S. Pat. No. 4,137,148. U.S. Pat. Nos. 4,283,271 and 4,283,272 teach continuous processes for producing dewaxed lubricating oil base stock including hydrocracking a hydrocarbon feedstock, catalytically dewaxing the hydrocrackate and hydrotreating the dewaxed hydrocrackate. Both latter patents, recognized as advances in the art, teach use of catalyst comprising zeolite ZSM-5 or ZSM-11 for the dewaxing phase. The foregoing patents indicate the state of the dewaxing art and are incorporated herein by references as background.

It is inferentially evident from the foregoing background material that the manufacture of modern high quality lubricants in geneal requires that the crude be treated in a sequence of fairly complex and costly steps. It is further evident that there is a need for processes which can efficiently provide such lubricants from interchangeable and readily available low grade crudes.

It is an object of the present invention to provide an improved process for dewaxing a hydrocrackate and for the manufacture of hydrocracked lubricating oils. It is a further object to provide a method of manufacturing hydrocracked lubricating oils having a low pour point and good resistance to light. It is a further object of this invention to provide an energy-efficient process for manufacturing hydrocracked lubricating oils. These and other objects will become evident to one skilled in the art on reading this entire specification including the appended claims.

SUMMARY OF THE INVENTION

Figure 1:
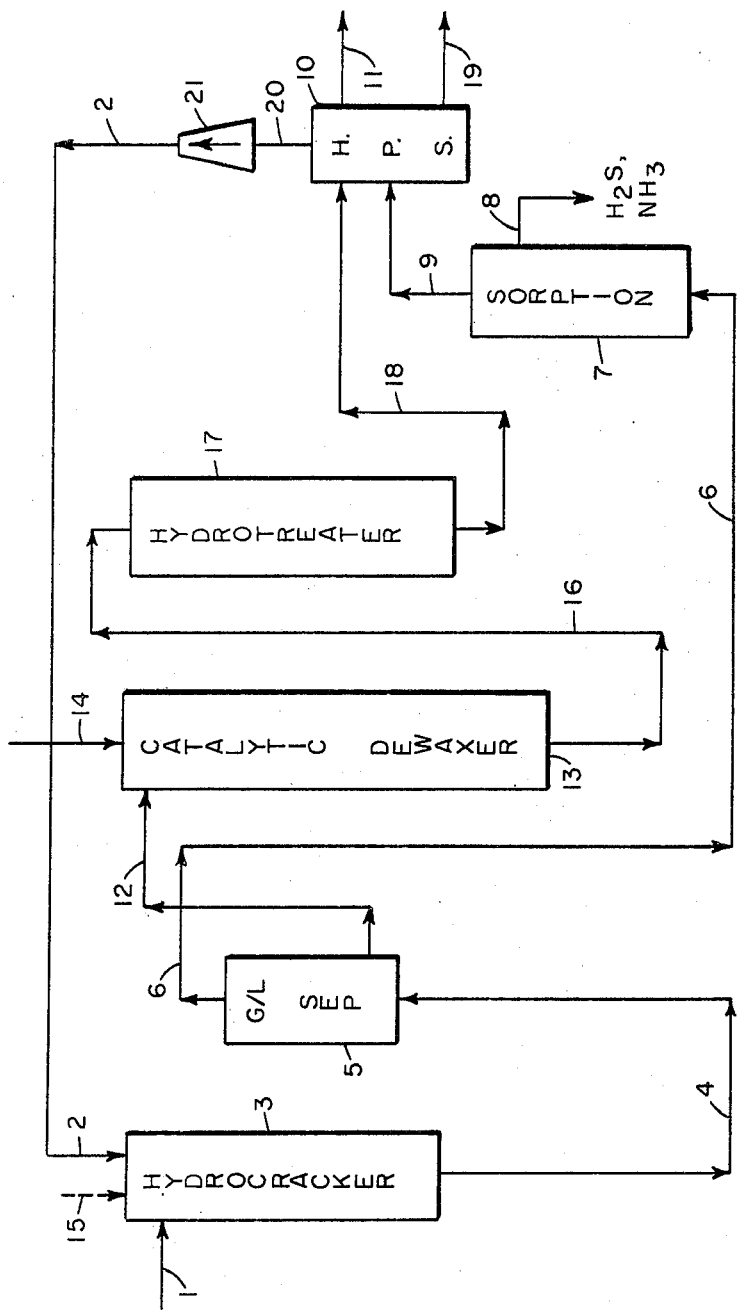
FIG. 1 is a process flow diagram illustrating an embodiment of the present invention including the relationship of process units.

This invention provides an energy-efficient process for dewaxing hydrocrackate and, therefore, for manufacturing a stabilized and dewaxed hydrocracked lubricating oil stock from a hydrocarbon feedstock boiling above about 343° C. (650° F.), such as vacuum gas oils, and resids substantially free of asphaltenes. The process comprises passing a hydrocrackate effluent from a catalytic hydrocracking process operation through a catalytic dewaxing process operation provided with a catalyst comprising zeolite ZSM-23. It, therefore, further comprises passing the feed sequentially through a hydrocracking zone, a catalytic dewaxing zone provided with a dewaxing catalyst comprising zeolite ZSM-23 and a hydrotreating zone at high pressure conditions in each of said zones.

The use of catalyst comprising zeolite ZSM-23 in the dewaxing reactor of this process provides several profound advantages over the art. One advantage is that the temperature required to achieve a desired pour point is higher than that for a standard catalyst, such as, for example, a zeolite ZSM-5 catalyst, more nearly matching the temperature required for the hydrocracking reactor. This minimizes the need for quenching of hydrocrackate effluent from the hydrocracking stage of the process resulting in substantial energy saving. Also, the yield of dewaxed oil is higher at comparable operating effort than the art methods. An additional advantage is that the viscosity index of the dewaxed oil is higher than that obtained by the art methods employing zeolites other than ZSM-23 (e.g. ZSM-5) in the dewaxing stage catalyst.

EMBODIMENTS

An embodiment of the present process will now be illustrated by reference to FIG. 1 of the drawings.

The feed, which may be any hydrocarbon feedstock boiling above about 343° C. (650° F.), such as a heavy neutral oil or a deasphalted residuum, is introduced via line 1 together with hydrogen via line 2 to hydrocracker section 3. Hydrocracker section 3 includes a catalytic hydrocracking zone at conditions effective to convert in a single pass at least 20% of the feed to materials boiling below the initial boiling point of said feed.

The effluent from the hydrocracker 3 including excess hydrogen may be contaminated with free hydrogen sulfide and in some cases with ammonia, since the hydrocracking step, in addition to saturating aromatic compounds, also is accompanied by desulfurization and denitrogenation. This effluent may be passed via line 4 to a high pressure gas-liquid separator (G/L Sep) 5 wherein the hydrocrackate is separated from contaminated hydrogen. The contaminated hydrogen may be passed from separator 5 via line 6 to a high pressure sorption section 7 wherein a substantial fraction of the hydrogen sulfide and of the ammonia are removed via line 8.

The hydrogen from sorption unit 7 may be passed via line 9 to a high pressure separator section 10 wherein it is separated from light hydrocarbons which are removed via line 11.

The hydrocrackate separated in separator section 5 is passed via line 12 to catalytic dewaxing section 13 along with makeup hydrogen introduced via line 14. It is important to note for purposes of this invention that the only hydrogen supplied to the catalytic dewaxer section 13 is fresh hydrogen having a hydrogen sulfide partial pressure of less than about 5 psia and less than 100 ppm of ammonia. The amount of hydrogen supplied via line 14 may be up to about the amount consumed in the process. Thus, all of the makeup hydrogen may be supplied via line 14. Alternatively, if it is desired to supply the catalytic dewaxer 13 less than the makeup requirement of the system, the remainder may be supplied to the hydrocracker via line 15, or at any other point in the system.

The zeolitic dewaxing catalyst component, with or without a hydrogenation component, used in dewaxing section 13 is zeolite ZSM-23. Zeolite ZSM-23 is described in U.S. Pat. Nos. 4,076,842 and 4,104,151, the contents of each being hereby incorporated herein by reference. The hydrogenation component associated with the ZSM-23 component of the dewaxing catalyst may be a metal from Group VIII of the Periodic Table of Elements or a mixture of such metals alone or in combination with a metal from Group VI of the Periodic Table of Elements or a mixture thereof. Non-limiting examples of the metals from Group VIII for this purpose include platinum, palladium, iridium, ruthenium, cobalt and nickel. The Group VI metals are chromium, molybdenum and tungsten.

The effluent from the catalytic dewaxer 13, including excess hydrogen, is passed via line 16 to hydrotreater unit 17. Catalytic hydrotreater 17 contains a hydrotreating catalyst in a hydrotreating zone at stabilizing conditions. Examples of hydrotreating catalysts include, without limitation, one or more metals from Group VIII (e.g. cobalt and nickel) and Group VI (e.g. molybdenum and tungsten) of the Periodic Table of Elements supported by an inorganic oxide such as, for example, alumina or silica-alumina.

The effluent from the hydrotreater unit is passed via line 18 to a high pressure separation section 10 wherein it is treated to separate light hydrocarbons, which are removed together with a hydrogen bleed via line 11. Also separated is the hydrocarbon mixture comprising a stabilized and dewaxed hydrocracked lubricating oil stock, which is recovered via line 19. The hydrocarbon mixture containing the lubricating oil stock is passed via line 19 to another unit for recovery of the lubricating oil stock, which other unit is not part of this invention. The makeup and recycle hydrogen separated in section 10 is passed via line 20 to compressor 21 to raise its pressure and then passed via line 2 to the hydrocracker 3.

In the preferred mode of operation of this embodiment, the pressure in line 20, which is downstream from pump 21, and the pressure in line 2, which is upstream of pump 21, do not differ by more than about 750 psig.

The embodiment shown in FIG. 1 of the process of this invention is illustrative of processing a hydrocarbon oil by the sequence of steps comprising hydrocracking, catalytic dewaxing by the present method and stabilization, in that order, with only fresh hydrogen provided to the catalytic dewaxer. It is known that hydrocracking by itself results in an unstable oil, and catalytic dewaxing in some instances also contributes to instability. By disposing the catalytic dewaxing step between the hydrocracking and stabilization step in the manner described in this embodiment, a very efficient over-all process results with the production of a stabilized and dewaxed hydrocracked lubricating oil stock.

It will be recognized by those skilled in the art that various separation steps conducted at high pressure may be advantageously incorporated in the process flow diagram of FIG. 1. For example, a high pressure separation unit may be located in line 12 or line 16, for example, to remove a low molecular weight fraction of hydrocarbon not suitable for inclusion in the final lubricant base stock, thereby reducing the hydrocarbon load to subsequent sections.

The reaction conditions for the catalytic process steps herein described are summarized in Table I.

TABLE I

|  | Hydro-cracking | Dewaxing | Hydro-treating |
| --- | --- | --- | --- |
| Pressure, broad, psig | 1000–3000 | 200–3000 | 1000–3000 |
| Pressure, preferred | 1500–2500 | 1500–2500 | 1500–2500 |
| Temperature, broad, °C. | 260–482 | 260–482 | 176–371 |
| Temperature, preferred, °C. | 343–427 | 343–427 | 204–316 |
| LHSV,* broad | 0.1–5 | 0.2–20 | 0.1–10 |
| LHSV, preferred | 0.5–2 | 0.5–5 | 0.2–3 |
| $H_2$ gas, SCF/bbl, broad | 1000–20,000 | 500–20,000 | 500–20,000 |
| $H_2$ gas, SCF/bbl, preferred | 2000–10,000 | 500–3000 | 500–3000 |

*LHSV = liquid hourly space velocity, i.e. volumes of feed per volume of catalyst per hour.

A wide variety of hydrocracking catalysts are contemplated as suitable for use in the process of this invention. Such catalysts in general possess an acid function and a hydrogenation function, exemplified by a porous acidic oxide such as a silica alumina or silica zirconia associated with a nickel-tungsten or palladium or platinum, or cobalt-molybdenum or nickel-molybdenum component. In general, a Group VIII metal or a combination of a Group VI and a Group VIII metal, as the oxides or sulfides thereof, deposited on silica alumina or silica zirconia, may serve as hydrocracking catalyst. The hydrocracking itself may be conducted in two or more stages, with pretreatment of the raw feed as part of the first stage. Catalyst suitable for the dewaxing and hydrotreating steps have been described above.

The zeolite ZSM-23 dewaxing catalyst component may be incorporated with a matrix or binder component comprising a material resistant to the temperature and other process conditions.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Flordia clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite ZSM-23 employed herein may be composited with a porous matrix material, such as alumina, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of zeolite ZSM-23 component and inorganic oxide gel matrix, on an anhydrous basis, may vary widely with the zeolite content ranging from between about 1 to about 99 percent by weight and more usually in the range of about 5 to about 80 percent by weight of the dry composite.

The above-defined hydrogenation component associated with the dewaxing catalyst may be on the zeolite component as above-noted or on the matrix component or both.

In order to more fully illustrate the nature of the present invention, the improvement over the art attainable thereby and the manner of practicing same, the following examples are presented.

EXAMPLE 1

Since the effluent hydrockate from the hydrocracking reactor is at a temperature of at least about 371° C. (700° F.), a catalytic dewaxing stage downstream therefrom would desirably be operated at a temperature as close to 371° C. (700° F.) as possible while providing desirable lube yield and viscosity. This example compares the present process with that of the art, e.g. U.S. Pat. Nos. 4,283,271 and 4,283,272, and further with expensive non-catalytic solvent dewaxing which provides high lube yields and viscosity index.

A hydrockate charge stock having the following properties:

| Gravity, °API | 30.7 |
| --- | --- |
| Specific | 0.8724 |
| Pour Point, °C. | 46 |
| K.V. at 100°C., cs | 7.29 |
| Sulfur, Wt. % | less than 0.06 |
| Nitrogen, ppm | less than 1 |
| Distillation, D-2887, °C. | |
| 0.5% | 283 |
| 1 | 293 |
| 5 | 330 |
| 10 | 364 |
| 30 | 446 |
| 50 | 482 |

| -continued | |
|---|---|
| 70 | 505 |
| 90 | 531 |
| 95 | 539 |
| 98 | 552 | was charged to a dewaxing reactor containing a catalyst extrudate of 65 wt. % alumina and 35 wt. % HZSM-23. The HZSM-23 zeolite was prepared as described in U.S. Pat. No. 4,076,842 with pyrrolidine as the cation source in the synthesis reaction mixture. The hydrocrackate was passed over the catalyst at 400 psig, 2500 SCF of hydrogen/bbl and an LHSV of 0.5. In Table II below, results are compared with those obtained with the standard dewaxing catalyst (U.S. Pat. Nos. 4,283,271 and 4,283,272) at an LHSV of 1.0 so that the contact time based on catalyst zeolite content was identical. Table II also shows results obtained from the same hydrocrackate by solvent dewaxing conducted at −23° C. (−10° F.), 60/40 volume ratio MEK/toluene solvent and 3/1 volume ratio solvent/oil.

TABLE II

| Dewaxing Comparisons, Example 1 | | | |
|---|---|---|---|
| | HZSM-23 | Standard Catalyst | Solvent |
| Temperature, °C. | 302 | 329 | 274 | — |
| Lube Yield, wt. % | 91.0 | 85.0 | 78.8 | 85.6 |
| Lube Properties | | | | |
| Gravity, °API | 30.3 | 30.2 | 29.1 | 29.3 |
| Specific | 0.8745 | 0.8751 | 0.8811 | 0.8800 |
| Pour Point, °C. | +7.2 | −12.2 | −9.4 | −17.7 |
| K.V. at 40° C., cs | 58.23 | 61.02 | 71.17 | 56.82 |
| K.V. at 100° C., cs | 7.90 | 8.04 | 8.59 | 7.72 |
| SUS at 38° C. | 301 | 316 | 370 | 294 |
| Viscosity Index | 100.6 | 97.6 | 89.8 | 98.7 |
| Distillation, D-2887, °C. | | | | |
| 0.5% | 296 | 289 | 302 | 283 |
| 1 | 305 | 301 | 311 | — |
| 5 | 343 | 341 | 346 | 324 |
| 10 | 376 | 374 | 374 | 352 |
| 50 | 479 | 479 | 479 | 473 |
| 90 | 532 | 532 | 532 | 531 |
| 95 | 544 | 544 | 542 | 579 |
| 98 | 557 | 557 | 554 | — |

From the above comparison it is observed that the temperature required for the HZSM-23 catalyst to provide a −12.2° C. pour is about 38° C. higher than for the standard art catalyst and closer to the temperature of the effluent from the hydrocracking reactor. Also, lube yield and viscosity index provided by the HZSM-23 catalyst is much higher than that provided by the standard art catalyst, being about the same as that provided by solvent dewaxing.

EXAMPLE 2

Figure 2:
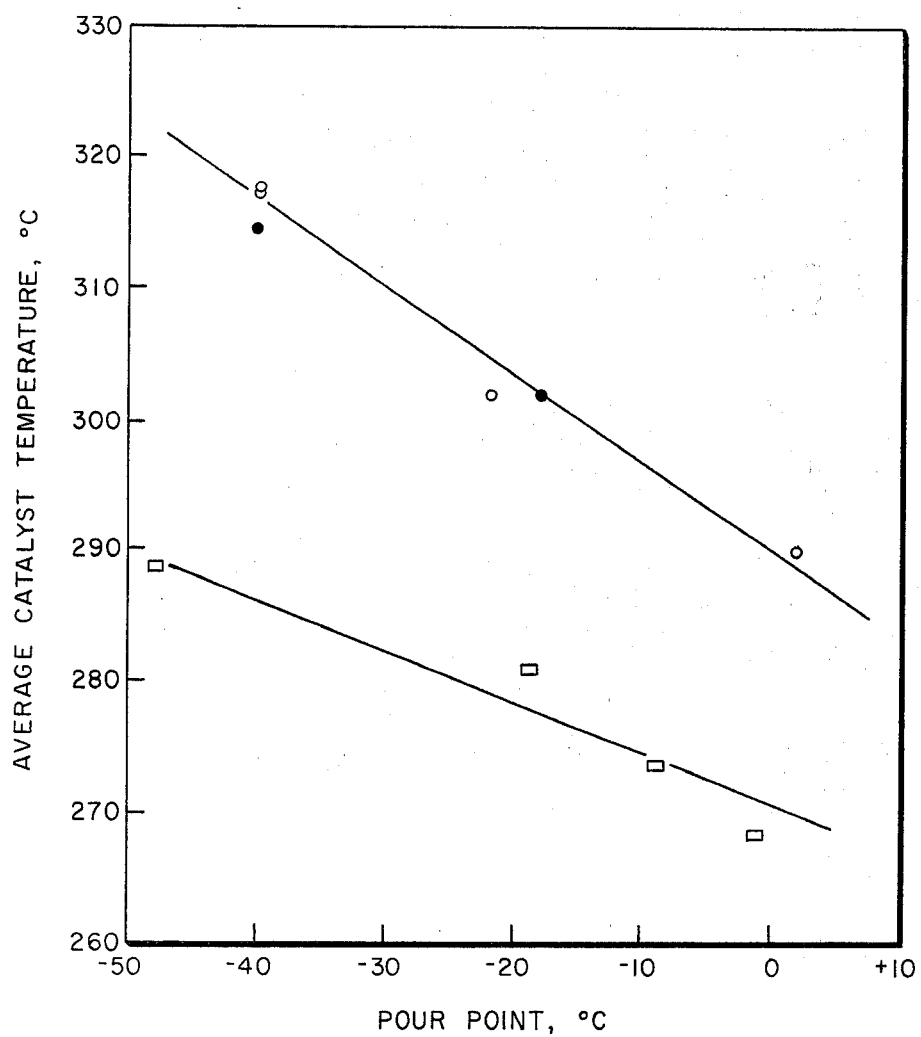
FIG. 2 is a plot of dewaxing catalyst temperature v. product pour point.
Figure 3:
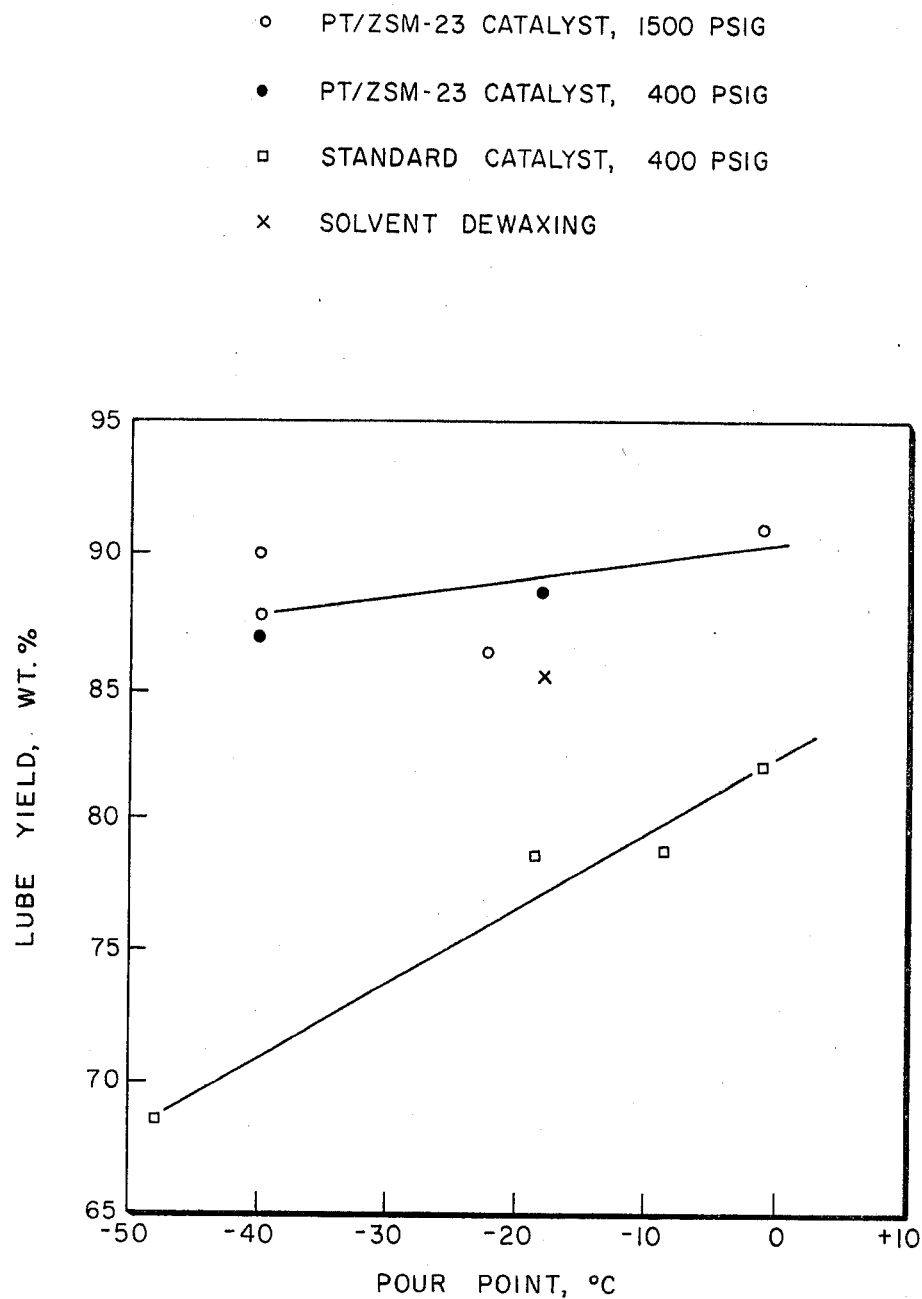
FIG. 3 is a plot of lube product yield v. product pour point.
Figure 4:
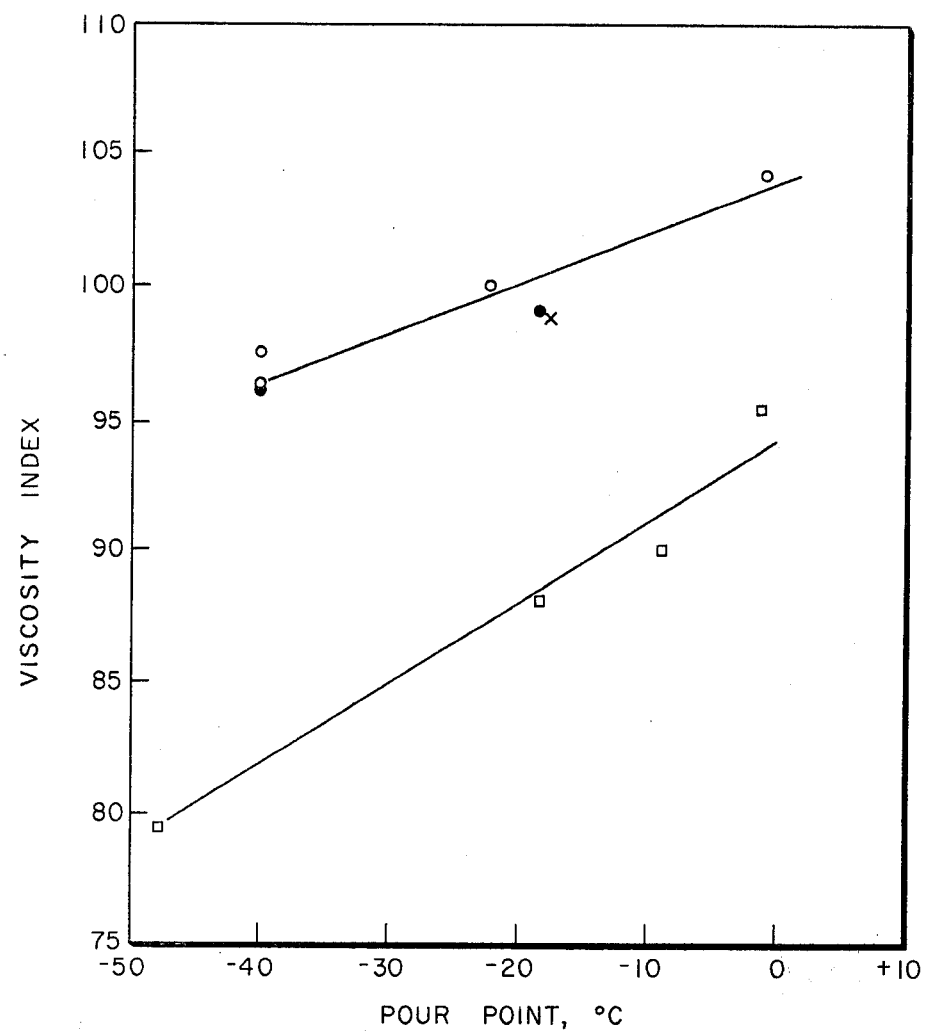
FIG. 4 is a plot of product viscosity index v. product pour point.

The ZSM-23 dewaxing catalyst for this example was the same as that used in Example 1, except that it contained 0.5% platinum incorporated via impregnation with a platinum amine complex. The charge stock of Example 1 was processed over this catalyst at both 1500 and 400 psig, the other conditions being the same as in Example 1. Results over the Pt/ZSM-23 catalyst, compared with results under comparable conditions over the standard dewaxing catalyst of Example 1 and solvent dewaxing are shown in FIGS. 2, 3 and 4. FIG. 2 shows the higher average catalyst temperature attainable for the Pt/ZSM-23 catalyst compared to that attainable for the standard catalyst at like product pour point. FIG. 3 shows the higher lube yield attainable by the Pt/ZSM-23 catalyst compared to that attainable by the standard catalyst and even solvent dewaxing at like product pour point. FIG. 4 shows the higher viscosity index attainable by the Pt-ZSM-23 catalyst compared to that attainable by the standard catalyst at like product pour point.

EXAMPLE 3

The charge stock to the dewaxing reactor in this example was a hydrocrackate having the following properties:

| Gravity, °API | 33.1 |
|---|---|
| Specific | 0.8597 |
| Pour Point, °C. | 29.4 |
| K.V. at 100° C., cs | 4.25 |
| Sulfur, wt. % | 0.02 |
| Nitrogen, ppm | less than 0.2 |
| Distillation, D-2887, °C. | |
| 0.5% | 282 |
| 1 | 291 |
| 5 | 321 |
| 10 | 344 |
| 30 | 389 |
| 50 | 415 |
| 70 | 436 |
| 90 | 466 |
| 95 | 479 |
| 98 | 493 |

Results of catalytically dewaxing this hydrocrackate over the Pt/ZSM-23 catalyst and the standard catalyst used in U.S. Pat. Nos. 4,283,271 and 4,283,272 at 1500 psig and 400 psig, respectively, are summarized in Table III. The other conditions for this example are the same as those for Examples 1 and 2.

TABLE III

| Dewaxing Comparison, Example 3 | | |
|---|---|---|
| | Pt/ZSM-23 | Standard Catalyst |
| Pressure, psig | 1500 | 400 |
| Temperature, °C. | 316 | 275 |
| Lube Yield, wt. % | 79.5 | 76.8 |
| Lube Properties | 32.6 | 31.3 |
| Gravity, °API | | |
| Specific | 0.8623 | 0.8692 |
| Pour Point, °C. | −29 | −29 |
| K.V. at 40° C., cs | 28.82 | 28.20 |
| K.V. at 100° C., cs | 4.99 | 4.82 |
| SUS at 38° C. | 149.1 | 146.2 |
| Viscosity Index | 96.4 | 86.1 |
| Distillation, D-2887, °C. | | |
| 0.5% | 319 | 288 |
| 1 | 327 | 296 |
| 5 | 352 | 324 |
| 10 | 368 | 344 |
| 50 | 422 | 415 |
| 90 | 474 | 472 |
| 95 | 477 | 489 |
| 98 | 510 | 531 |

The above results show that even with this charge stock the ZSM-23 catalyst again requires a higher temperature than the standard catalyst and provides a higher product yield of higher viscosity index than the standard catalyst.

What is claimed is:

1. A process for dewaxing hydrocrackate resulting from catalytic hydrocracking a hydrocarbon feedstock boiling above about 343° C. which comprises contacting said hydrocrackate in the presence of hydrogen at a temperature of from about 260° C. to about 482° C., a pressure of from about 200 psig to about 3000 psig and a LHSV of from about 0.2 to about 20 with a catalyst comprising crystalline zeolite ZSM-23.

2. The process of claim 1 wherein said catalyst has associated therewith a hydrogenation component.

3. The process of claim 2 wherein said hydrogenation component is a metal from Group VIII of the Periodic Table of Elements or a mixture of such metals alone or in combination with a metal from Group VI of the Periodic Table of Elements or a mixture thereof.

4. The process of claim 2 wherein said catalyst further comprises a binder material.

5. The process of claim 4 wherein said binder material is alumina.

6. A process for producing a dewaxed lubricating oil base stock from a hydrocarbon feedstock boiling above about 343° C. which comprises hydrocracking said feedstock in the presence of a hydrocracking catalyst at hydrocracking conditions including a temperature of from about 260° C. to about 482° C., a pressure of from about 1000 psig to about 3000 psig and a LHSV of from about 0.1 to about 5 to produce a hydrocrackate, dewaxing said hydrocrackate in the presence of hydrogen and a dewaxing catalyst comprising crystalline zeolite ZSM-23 at dewaxing conditions including a temperature of from about 260° C. to about 482° C., a pressure of from about 200 psig to about 3000 psig and a LHSV of from about 0.2 to about 20 to produce a dewaxed hydrocrackate, and hydrotreating said dewaxed hydrocrackate in the presence of a hydrotreating catalyst at hydrotreating conditions including a temperature of from about 176° C. to about 371° C., a pressure of from about 1000 psig to about 3000 psig and a LHSV of from about 0.1 to about 10.

7. The process of claim 6 wherein said dewaxing catalyst has associated therewith a hydrogenation component.

8. The process of claim 7 wherein said hydrogenation component is a metal from Group VIII of the Periodic Table of Elements or a mixture of such metals alone or in combination with a metal from Group VI of the Periodic Table of Elements or a mixture thereof.

9. The process of claim 7 wherein said dewaxing catalyst further comprises a binder material.

10. The process of claim 9 wherein said binder material is alumina.

11. The process of claim 1, 2, 3, 4, or 5 wherein said temperature is from about 343° C. to about 427° C., said pressure is from about 1500 psig to about 2500 psig and said LHSV is from about 0.5 to about 5.

12. The process of claim 6, 7, 8, 9 or 10 wherein said hydrocracking conditions include a temperature of from about 343° C. to about 427° C., a pressure of from about 1500 psig to about 2500 psig and a LHSV of from about 0.5 to about 2, said dewaxing conditions include a temperature of from about 343° C. to about 427° C., a pressure of from about 1500 psig to about 2500 psig and a LHSV of from about 0.5 to about 5, and said hydrotreating conditions include a temperature of from about 204° C. to about 316° C., a pressure of from about 1500 psig to about 2500 psig and a LHSV of from about 0.2 to about 3.

* * * * *